UNITED STATES PATENT OFFICE.

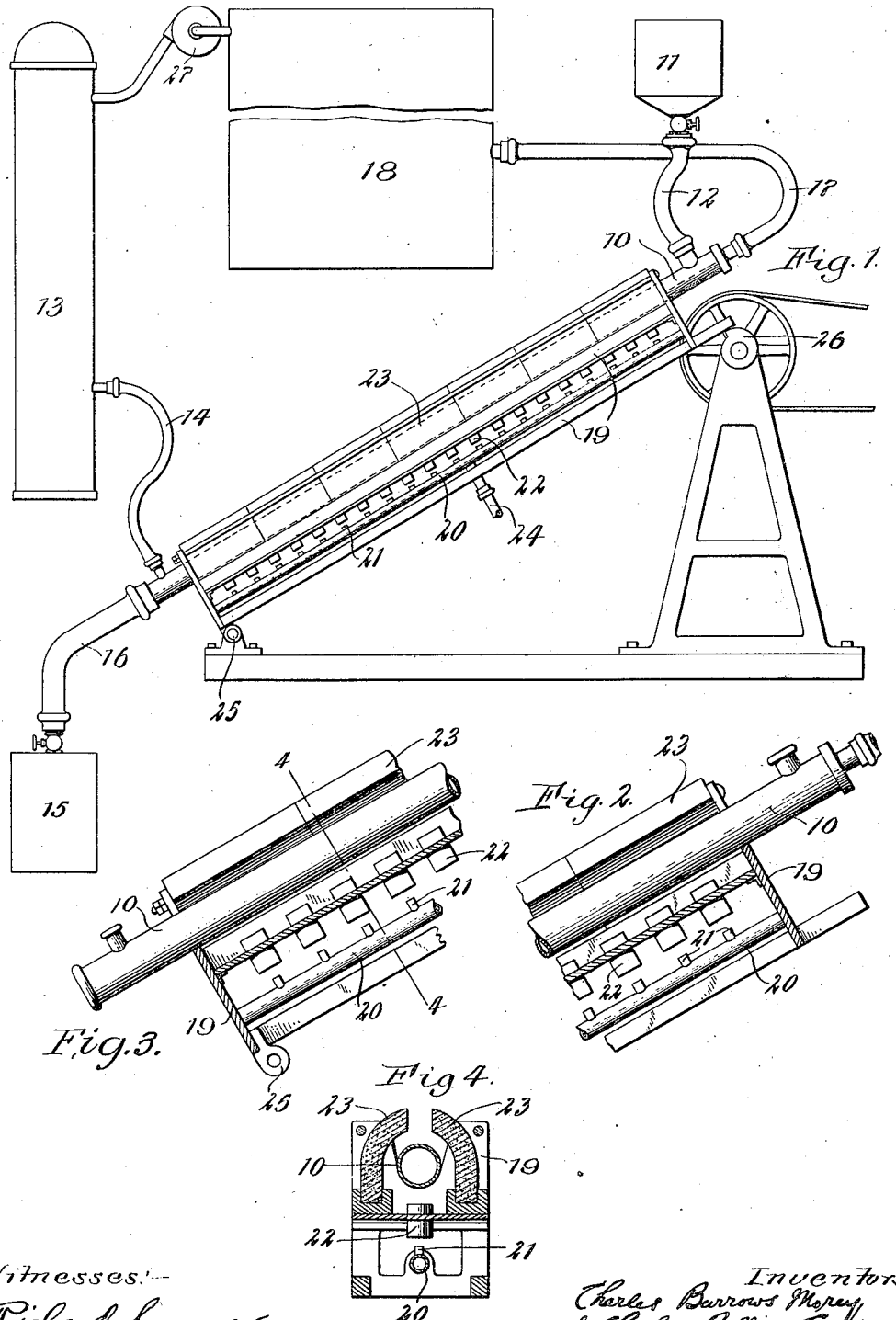

CHARLES BURROWS MOREY AND CHARLES ROLLIN CRAINE, OF BUFFALO, NEW YORK, ASSIGNORS TO LARKIN CO., OF BUFFALO, NEW YORK.

APPARATUS FOR MAKING CATALYTIC MATERIAL.

1,167,915.  Specification of Letters Patent.  Patented Jan. 11, 1916.

Application filed May 15, 1914. Serial No. 838,778.

*To all whom it may concern:*

Be it known that we, CHARLES BURROWS MOREY and CHARLES ROLLIN CRAINE, citizens of the United States, residing at Buffalo, in the county of Erie and State of New York, have invented a new and useful Improvement in Apparatus for Making Catalytic Material, of which the following is a specification.

This invention relates to an apparatus for producing catalytic material in an active state by subjecting suitable inactive or raw material while flowing through a conduit to the action of a suitable gas.

Any of the well known materials usually employed for producing active catalytic substances may be treated in this apparatus, for instance, fullers' earth, infusorial earth, pumice stone, finely granulated wood charcoal or the like, impregnated or coated with or having deposited thereon copper, iron, nickel, cobalt, palladium, rhodium, platinum or similar metals or compounds of the same. Diatomaceous earth impregnated with nickel hydroxid is preferred. The gas which is usually employed for acting upon the material is hydrogen although other gases or gaseous mixtures may be employed.

The apparatus comprises in its main features an inclined tube or conduit through which the granular material flows downwardly, either by gravity alone or by gravity assisted by a jarring or shaking action, and through which the gas flows upwardly, the tube or conduit being heated in any suitable manner, for instance, by gas flames, superheated steam or electrical current.

In the accompanying drawings: Figure 1 is a side elevation of this improved apparatus. Fig. 2 is a side elevation, partly in section and on an enlarged scale, of the upper portion of the apparatus. Fig. 3 is a similar view of the lower portion of the apparatus. Fig. 4 is a cross section on line 4—4, Fig. 3.

10 represents the inclined tube or conduit of any suitable form and dimension in which the material is subjected to the action of a suitable reducing or other gas, and to the upper end of which the raw material is supplied from a feed receptacle 11 by a flexible pipe 12 or other suitable means. This inclined tube is supplied with gas from a gas holder or generator 13 by means of a flexible pipe 14 which is connected with the lower portion of the tube 10. The treated material is discharged from the lower end of the latter into a closed receptacle 15 by a flexible pipe 16 in such manner that the material is protected against exposure to the atmosphere.

The material flows downwardly through the inclined tube and is acted upon by the reducing gas which flows upwardly through the tube. The gas escapes from the upper end of the tube and may be conducted by a flexible pipe 17 to a scrubbing apparatus or tower 18 in which objectionable matters are separated from the gas and from which the purified gas is returned to the gas holder 13 to which fresh gas is supplied as may be necessary. In that case the circulation of the gas through the apparatus is maintained by a pump 27 of any suitable construction. The gas may, however, be otherwise disposed of or utilized after leaving the upper end of the inclined treating tube.

The inclined tube or conduit is heated to a suitable temperature which may vary according to the nature of the material to be treated and other conditions, and any suitable heating means may be employed. When diatomaceous earth impregnated with nickel hydroxid is treated, a temperature of about 550° F. is preferred.

As shown in the drawings, the inclined tube is heated by gas flames produced by atmospheric or Bunsen burners of well known construction.

19 represents the frame in which the inclined treating tube is mounted; 20 represents the fuel-gas pipe which is secured in this frame lengthwise underneath the treating tube and provided with gas jets 21; and 22 represents the air mixing tubes arranged above the gas jets. The inclined treating tube is arranged between two rows of fire bricks or tiles 23 which are supported on the frame 19 on opposite sides of the inclined tube and separated therefrom and from each other by flame passages in such manner that the heat is concentrated upon the tube, which latter is enveloped by the flames and hot gases.

24 represents a flexible pipe through which the fuel gas is supplied to the pipe 20.

The treating tube may be inclined at such an angle, usually about 42°, that the material will flow through the tube by gravity, or as shown in the drawings, the tube may be inclined at a less angle and a jarring or shaking mechanism be provided for causing the material to flow properly. Any suitable mechanism may be employed for this purpose, for instance, the supporting frame 19 may be movably supported by a hinge 25 or otherwise at its lower end and rest at its upper end upon a rotating cam 26.

In flowing downwardly through the inclined tube or conduit the catalytic material is acted upon by the hot reducing gas which flows upwardly through the tube and which quickly produces an active catalytic state in the raw material. Catalyzer toxins which may be contained in the reducing gas have little or no harmful effect on the activity of the resulting catalyzer because the treatment is effected with great rapidity. As no revolving parts are employed in connection with the inclined treating tube no stuffing boxes are required and the dangers resulting from a leakage of hydrogen or other gas are thereby avoided.

We claim as our invention:

1. In an apparatus for producing catalyzers, the combination with an inclined conduit through which the material flows while being treated, of means for feeding the raw material into the upper portion of said conduit, means for discharging the treated material from the lower portion of said conduit, means for supplying a treating gas to said conduit and means located exterior to said conduit for causing the material to pass through said conduit.

2. In an apparatus for producing catalyzers, the combination with an inclined conduit through which the material flows while being treated, of means for feeding the raw material into the upper portion of said conduit, means for discharging the treated material from the lower portion of said conduit, means for supplying a treating gas to said conduit, means for heating said conduit and means for jarring said conduit to cause the material to pass through the same.

3. In an apparatus for producing catalyzers, the combination with an inclined conduit through which the material flows while being treated, of means for feeding the raw material into the upper portion of said conduit, means for discharging the treated material from the lower portion of said conduit, means for supplying a treating gas to said conduit, and means for jarring said conduit.

4. In an apparatus for producing catalyzers, the combination with an inclined conduit through which the material flows while being treated, of means for feeding the raw material into the upper portion of the conduit, means for receiving the material at the lower portion of said conduit, means for supplying a treating gas to said conduit, said conduit being pivoted at one end, and means for jarring the upper portion of said conduit.

5. In an apparatus for producing catalyzers, the combination with an inclined conduit through which the material flows while being treated, of means for feeding the raw material into the upper portion of said conduit, means for receiving the treated material at the lower portion of said conduit, means for supplying a treating gas to said conduit, said conduit being pivoted at one end, and a rotating member on which the other end of said conduit rests and which jars the conduit to cause the material to flow through the same.

6. In an apparatus for producing catalyzers, the combination with an inclined conduit through which the material flows while being treated, of means for feeding the raw material into the upper portion of said conduit, means for discharging the treated material from the lower end of said conduit and for collecting said material without exposing the same to the atmosphere, means for supplying a treating gas to said conduit, and means located entirely exterior to said conduit for causing the material to pass through said conduit.

Witness our hands in the presence of two subscribing witnesses.

CHARLES BURROWS MOREY.
CHARLES ROLLIN CRAINE.

Witnesses:
HOWARD W. MOREY,
REGINALD J. TRESIDDER.